Figure 1:
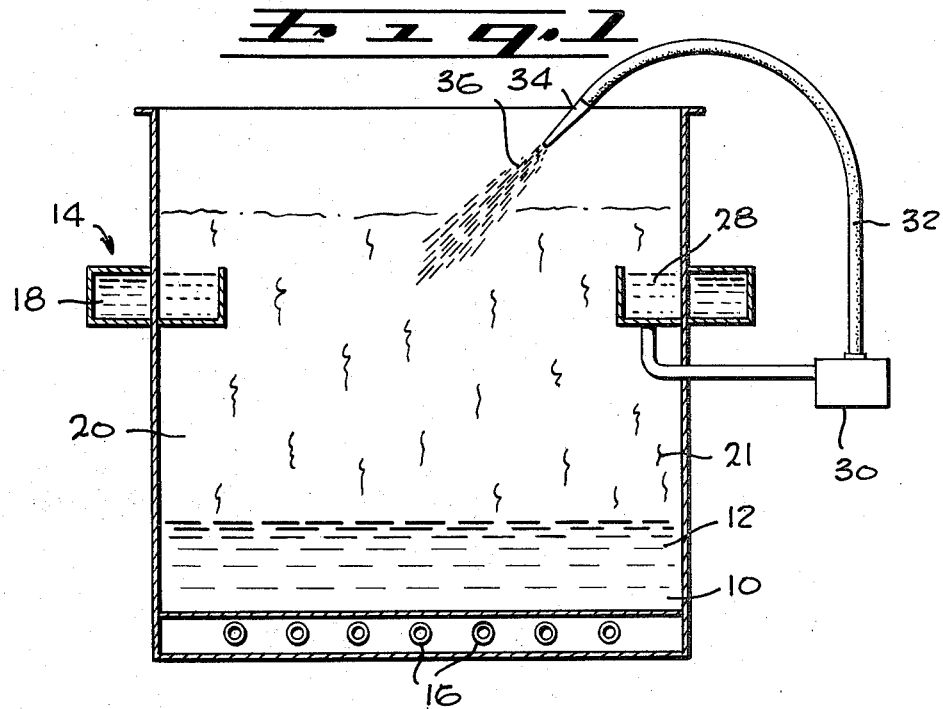

United States Patent [19]
Molina

[11] 3,789,221
[45] Jan. 29, 1974

[54] DYE PENETRANT COMPOSITION AND METHOD UTILIZING SAME

[75] Inventor: Orlando G. Molina, Westminster, Calif.

[73] Assignee: North American Rockwell Corporation, El Segundo, Calif.

[22] Filed: Feb. 5, 1973

[21] Appl. No.: 329,775

[52] U.S. Cl. .............................................. 250/302
[51] Int. Cl. ........................................... G01n 21/16
[58] Field of Search .............. 250/302; 252/301.2 P

[56] References Cited
UNITED STATES PATENTS
3,028,338   4/1962   Parker ......................... 252/301.2 P Primary Examiner—James W. Lawrence
Assistant Examiner—Davis L. Willis
Attorney, Agent, or Firm—Francis X. LoJacono, Sr.; L. Lee Humphries

[57] ABSTRACT

Method for detecting cracks and flaws in the surface of an object or part, employing a dye penetrant composition which, following application of the dye penetrant composition to the part surface, includes means for facilitating removal of excess dye penetrant from such surface, in the form of a volatile degreaser-type solvent such as 1,1,1-trichloroethane. According to one embodiment an object to be inspected is immersed in a dye penetrant which will withstand high temperatures, particularly a dye penetrant containing an N-alkyl-2-pyrrolidone, for example N-methyl-2-pyrrolidone, and a dye which is soluble in said pyrrolidone, preferably a fluorescent dye, and including a volatile solvent, preferably 1,1,1-trichloroethane, the dye penetrant composition being maintained at the boiling temperature of the volatile solvent, causing vaporizing of such solvent into a zone above the heated liquid dye penetrant composition, removing the object from the heated liquid dye penetrant composition, passing the object into the zone containing vapors of the volatile solvent and maintaining the object in the vapor zone for a period sufficient to cause vapors of the volatile solvent contacting and condensing on the surface of the object, to wash excess liquid dye penetrant from the surface of the object back into the liquid dye penetrant composition, together with condensed vapors of volatile solvent, removing and drying the object. The process is conveniently carried out in a degreaser-type apparatus, in which the object is initially passed through the vapors of volatile solvent above the bubbling liquid dye penetrant composition in the bottom of the degreaser, permitting facile removal of any oil of or grease from the surface of the object, after which the object is then lowered into the liquid dye penetrant composition, then again passed upwardly through the vapors of volatile degreaser solvent to remove excess liquid dye penetrant and dried, as previously noted, following which the dried surface of the object containing dye penetrant in the cracks and defects thereof, with or without application of a developer, can be inspected under appropriate lighting conditions for detection of cracks and flaws.

19 Claims, 2 Drawing Figures

PATENTED JAN 29 1974 3,789,221

3,789,221

DYE PENETRANT COMPOSITION AND METHOD UTILIZING SAME

This invention relates to a novel dye penetrant composition and method for non-destructively testing metal specimens to locate and identify surface voids or defects, and is particularly concerned with the provision of a dye penetrant composition having good heat stability, embodying means in the form of a vapor-type degreaser solvent for readily removing excess penetrant from the surface of an object to which the dye penetrant composition has been applied, and to a method of penetrant inspection including applying a heated liquid dye penetrant composition of the type described above and incorporating a vapor type degreaser solvent, and immediately or shortly after application of such dye penetrant composition, causing removal of excess penetrant from the surface of the object by contacting the object containing dye penetrant with the vapors or condensate of degreaser solvent generated by the heated dye penetrant composition.

In known penetrant inspection methods for rapid location and evaluation of surface flaws or cracks in test bodies or parts, a dye penetrant composition, preferably containing a fluorescent dye, and which will penetrate the openings of the surface cracks or flaws in the part, is applied to the surface of the test body or part, and the excess penetrant composition is removed from the surface of the body. A developer composition may then be applied to the part surface, which acts as a wick and causes the liquid penetrant containing the fluorescent dye, which was retained in the cracks or surface flaws, to be drawn up out of the surface defects by capillary action. The part is then exposed to appropriate lighting conditions, such as invisible fluorescent light, and the location of the surface flaws is revealed by the emission of visible fluorescent light by the penetrant dye which was retained in the cracks or flaws after the excess penetrant composition was removed from the surface of the part.

As previously noted, following application of the dye penetrant composition to the part surface, it is necessary to remove excess penetrant from the surface of the part before the part can be inspected under proper lighting conditions to detect and locate the cracks and flaws. Such removal of excess penetrant is generally accomplished in various ways, depending on the composition of the dye penetrant. Thus for example where the dye penetrant is a water washable composition, excess penetrant can be removed by spraying a mixture of air and water over the part surface. Regardless as to the mode for removal of excess dye penetrant, generally, in the prior art, such removal of excess penetrant requires a separate independent stap usually externally of the equipment used for applying the dye penetrant to the part. Also, in addition to the time required for removal of the excess dye penetrant, an additional measurable time period is generally required for drying the part following removal of excess dye penetrant, prior to application of a developer or prior to inspection of the part under proper lighting conditions.

It is an object of the present invention to provide a dye penetrant composition which is stable and will withstand heating at elevated temperature, and including a volatile solvent which upon heating the dye penetrant composition at sufficiently high temperature will cause evaporation of such volatile solvent and produce a zone of such vapors above the liquid dye penetrant composition, so that an object or part after being contacted with the liquid dye penetrant composition, can be passed through such vapor zone which serves to remove excess dye penetrant and which also aids to almost immediately dry the part, the passage of the part through such vapor zone prior to treatment with a dye penetrant composition also serving to remove any grease or oil from the part surface to clean same.

The above objects and advantages are accomplished according to the invention by incorporating into a heat resistant penetrant composition of the type described below, a volatile degreaser or degreaser-type solvent such as 1,1,1-trichloroethane, and carrying out the steps of applying the dye penetrant to the part preferably and conveniently in a degreaser apparatus, wherein the penetrant composition is maintained at elevated temperature to produce boiling and evaporation of the solvent into a vapor zone above the penetrant for passage of the part after application of the dye penetrant composition, through said vapor zone to achieve removal of excess penetrant. The heat resistant dye penetrant into which the degreaser solvent is incorporated is a dye penetrant containing a dye, e.g., a fluorescent dye, and a pyrrolidone solvent for said dye, e.g., N-methyl-2-pyrrolidone. Such dye penetrant has the capability of being heated to elevated temperatures of the order of about 375° F without any observable deterioration, a temperature sufficiently high to readily permit evaporation of the volatile degreaser-type solvent incorporated in the dye penetrant.

Thus the invention provides a method which comprises contacting an object to be non-destructively tested for detecting cracks and flaws therein, with a heated liquid dye penetrant composition of the above type, including a volatile solvent as described more fully below, and which produces vapors of the volatile solvent in a zone above the heated dye penetrant composition, removing the object from the heated liquid dye penetrant composition, the object containing excess liquid dye penetrant on the surface of the object, introducing the object into the zone of vapors of said volatile solvent, contacting condensed or condensing volatile solvent vapors with the object and washing the excess liquid dye penetrant from the surface of the object back into the heated liquid dye penetrant composition, together with the condensed vapors of the volatile solvent, a portion of the liquid dye penetrant remaining in the cracks and flaws in the surface, and viewing the surface of the object under lighting conditions to obtain colored traces from the dye in the cracks and flaws.

In preferred practice, after treating the part in the vapor zone, the part is raised to a position above the vapor zone to permit drying of excess volatile solvent on the part.

Where the part or object initially contains grease or oil on the surface thereof, the object is first introduced into the zone of vapors of the volatile solvent and maintained therein for a period sufficient to remove the grease or oil, prior to contacting the object with the heated liquid dye penetrant composition.

As previously noted, the process is conveniently carried out in a degreaser apparatus, thus providing a closed system in which the volatile solvent or degreaser vapors are continuously evaporated from the heated dye penetrant composition containing such solvent, in the degreaser chamber, and then are condensed and caused to contact the surface of the part to remove excess dye penetrant, such excess dye penetrant together with the condensed volatile solvent being continuously washed back from the part into the heated liquid contents or liquid dye penetrant composition in the chamber of the degreaser. The volatile solvent vapors in the vapor zone or area of the degreaser are condensed on contact with the surface of the part or, in another modification as described more fully below, the part, while in the vapor zone, can be sprayed with pure liquid volatile solvent previously condensed from the vapors in the zone and maintained in a reservoir in the vapor zone. The only loss occurring in such a system is the minute amount of dye penetrant which remains entrapped within the defects of the parts being treated, and which accordingly is removed with such parts.

The heat stable dye penetrant composition hereof can sustain continuous heating or boiling over an extended period of time without noticeable change in performance, and the dye penetrant composition containing the degreaser type solvent can be maintained without requiring continuous addition of components, until such time as it becomes so contaminated, for example with grease, dirt or oil from the parts, or has lost its fluorescence, that is is discardeed and replenished.

Thus, the invention in effect provides a method and means to rapidly clean a part to be non-destructively tested by dye penetrant inspection, apply a heated penetrant solution or composition, remove excess penetrant solution from the part with practically simultaneous drying, and permit rapid inspection of the parts following such procedure.

It has been found that the dye penetrants of my copending application Ser. No. 220,414 filed Jan. 24, 1972, and containing an N-alkyl-2-pyrrolidone as dye solvent and a dye, particularly a fluorescent dye, are highly heat stable and are particularly effective, for use in conjunction with a volatile degreaser type solvent according to the invention. The pyrrolidone vehicle for the dye is compatible with the dye and with the other components of the composition, including the volatile degreaser-type solvent incorporated, and has the ability to dissolve a relatively large amount of dye per unit of volume and to hold a high concentration of dye in solution and provide good resolution and clarity of the dye trace. The alkyl group of such pyrrolidones contains from one to four carbon atoms, such as the methyl, ethyl, propyl, isopropyl, butyl and isobutyl derivatives, the preferred pyrrolidone of this type being N-methyl-2-pyrrolidone. Such dye penetrant in which the volatile degreaser-type solvent is incorporated can be an oil base, surfactant base, or solvent base penetrant composition.

As previously noted, the dye penetrant solution employed according to the invention preferably contains a fluorescent dye. Various types of fluorescent dyes can be employed including for example the dye marketed as Fluorol 7GA as well as other fluorescent dyes such as those marketed as Calcofluor Yellow, Azosol Brilliant Yellow 6GF, Rhodanine B, Rhodanine 6 GDN, Calcofouor White RW, Blancophor White AW, Auramine and Eosine G, and water soluble fluorescent dyes such as Blancophor FFG.

The fluorescent penetrant composition according to my above copending application and particularly containing N-methyl-2-pyrrolidone as dye solvent, permits rapid removal of the excess or remaining dye penetrant from the specimen surface by contact of the hot vapors of the volatile degreaser type solvent with such surface. Also, if desired, and as described in my above copending application Ser. No. 220,414, a surfactant can be incorporated into the dye penetrant composition, such as a water soluble or water insoluble surfactant, or a combination thereof, examples of such surfactants being a nonionic detergent such as Tergitol Nonionic NPX of Union Carbide, a hydrophilic nonionic detergent containing ether-oxygen groups, and which is understood to be a nonyl phenyl polyethylene glycol ether containing 10.5 ethylene oxide groups, and Tergitol TMN, a trimethyl nonyl ether of polyethylene glycol containing six ethylene oxide groups, or the water insoluble surfactant Tergitol Nonionic NP-14, also a nonyl phenyl polyethylene glycol ether but containing only four ethylene oxide groups. Also relatively nonvolatile solvents such as isobutyl heptyl ketone can be incorporated.

The amount of pyrrolidone solvent vehicle for the dye which can be used can vary considerably and can range from about 0.2% to about 45% by volume of the total penetrant composition including the degreaser-type volatile solvent. The ratio of dye to pyrrolidone can range from about one part of dye to about 25 parts of pyrrolidone, to about two parts of dye to about one part of pyrrolidone, by volume.

The dye penetrant composition employed according to the invention in conjunction with the volatile degreaser-type solvent hereof, can contain nonfluorescent or daylight type dyes such as azo type dyes, e.g., xyleneazo-beta-naphthol, Mefford No. 322 dye, believed to be o-tolueneazoxyleneazo-beta-naphthol, and the azo dyes marketed as Oil Red "O" and Sudan Red. These dyes conveniently can be employed where daylight or white light is only available, and particularly where the surface of the body to be detected contains relatively gross cracks. However, it is preferred to employ fluorescent dyes having greater sensitivity or detectability as result of the high contrast obtained by the fluorescent indications.

The volatile degreaser-type solvent incorporated into the penetrant noted above according to the invention, is a suitable organic solvent which is sufficiently volatile at relatively low temperatures to generate a substantial volume of solvent vapor from the liquid penetrant at such temperatures. For this purpose, preferably halogenated volatile solvents of this type are employed having a boiling point generally not in excess of about 200° F. Examples of suitable solvents are 1,1,1-trichloroethane, trichloroethylene and certain of the Freons such as Freon TF, which is 1,1,2-trichloro-1,2,2-trifluoroethane. Freon MF, which is trichlorofluoromethane, Freon FE, which is bromotrifluoromethane. The preferred volatile solvents according to the invention are 1,1,1-trichloroethane, also referred to herein as trichloroethane, and trichloroethylene, the former being particularly desirable. These volatile solvents are relatively non-toxic and are particularly effective since they boil at relatively low temperature, e.g., 166° F for 1,1,1-trichloroethane, 190° F for trichloroethylene, and 117° F for Freon TF, so that the above-noted dye penetrant composition containing such volatile solvents can be heated readily to a temperature permitting rapid evolution or boiling of these volatile solvent vapors out of the solution, without any deleterious effects or decomposition of the other components of the heat stable pyrrolidone-containing penetrant, which as previously noted is stable at temperatures up to about 375° F.

However, other halogenated solvents are unsuitable, since many such solvents have too high a boiling point, and the temperature to which the penetrant composition would have to be raised to permit rapid evaporation of such solvents not only would endanger the stability of the dye penetrant, but also would deleteriously affect corrosion resistant coatings on certain parts, such as for example chromate conversion coatings on aluminum, and anodized aluminum parts. Further, many such other halogenated solvents have a high degree of toxicity.

The proportion of degreaser-type volatile halogenated solvent incorporated in the dye penetrant composition can range from about 50 percent to about 97 percent, usually about 60 percent to about 95 percent, by volume of the total penetrant composition. The employment of an excessive amount of solvent, although not harmful, is generally uneconomic, and the employment of too small an amount of such volatile solvent is undesirable in that the amount of solvent vapors generated by the heated dye penetrant composition is insufficient to effectively remove excess dye penetrant from parts passed through the vapor zone, in a commercially sufficiently short period of treatment. Where surfactants and/or organic solvent such as ketone is present, the total amount thereof can range from about 2 percent to about 25 percent by volume of total penetrant composition including volatile solvent.

The process of the invention is described in greater detail below, taken in connection with the accompanying drawing illustrating a convenient type of conventional vapor degreaser apparatus which can be employed in carrying out the process.

Figure 2:
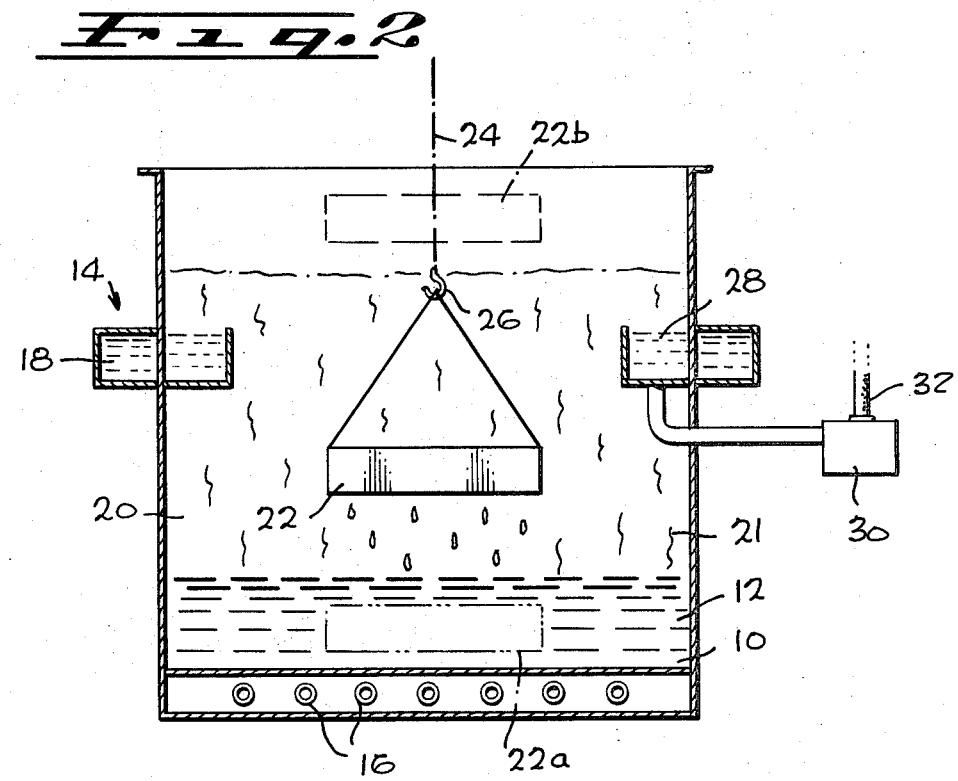

In the drawing:

FIG. 1 is a representation of a degreaser-type apparatus containing heated liquid dye penetrant composition at the bottom thereof, including volatile degreaser-type solvent, and showing the volatile vapor zone or area above such heated dye penetrant composition; and FIG. 2 illustrates the procedure according to the invention for application of heated dye penetrant composition to the part, removing excess dye penetrant from the part surface and drying the part.

Referring to the drawing, the dye penetrant composition of the invention including volatile degreaser-type, e.g., 1,1,1-trichloroethane, solvent, indicated at 10 is placed in the bottom chamber 12 of a conventional degreaser unit or apparatus 14. The unit contains a heating element 16 below the chamber, which can be thermostatically controlled in conventional manner, and a water jacket 18 is provided around the outer and upper periphery adjacent the vapor zone or area 20 above the bottom chamber 12, to cool and condense vapors in zone 20 and prevent passage of the vapors over the top of the unit and into the ambient atmosphere. The heat provided at 16 is controlled to provide rapid generation or boiling of the volatile solvent vapors from the dye penetrant composition 10 and passage of such vapors indicated at 21 into the vapor zone 20.

A part 22 (see FIG. 2) which is to be subjected to penetrant inspection, is first lowered by suitable means such as a chain indicated at 24 and hook 26, into the vapor or fume zone 20 above the chamber containing the dye penetrant composition 10, and if such part contains greasy or oily substances such part is maintained in contact with the volatile solvent vapor 21 in the vapor zone 20 for a period, e.g., of about 30 seconds to 5 minutes, to permit the trichloroethane or above-noted equivalent solvent, condensing on the part, to remove the greasy or oily substance from the part and clean same.

The part 22 is then lowered into the dye penetrant composition 10 in the lower chamber area or zone 12 of the apparatus containing the dye penetrant composition, to the dotted line position 22a in FIG. 2, and the part is maintained immersed in the heated liquid penetrant composition for a period, e.g., of about 30 seconds to about 2 minutes sufficient to permit passage and penetration of the dye penetrant composition 10 into the cracks, voids and defects in the surface of the part.

Where the part is initially clean, it can be lowered rapidly through the vapor zone 20 and immediately into the liquid dye penetrant zone 12.

As previously noted the liquid dye penetrant is maintained by suitable means at an elevated temperature, e.g., about 166° F in the case of 1,1,1-trichloroethane, to cause continuous rapid evolution or boiling of the trichloroethane from the solution 10 and into the vapor treatment zone 20 above such solution of liquid dye penetrant. Generally, the liquid penetrant composition is maintained at an elevated temperature near or substantially at the boiling point of the volatile-degreaser type solvent, to ensure formation of sufficient volatile solvent, e.g., trichloroethane, fumes or vapors, and the presence of a sufficient vapor concentration, either to remove oily residues from parts being cleaned prior to immersion in the liquid dye penetrant, and/or to remove excess penetrant following treatment of the part in the liquid dye penetrant.

The continuous boiling of the dye penetrant composition 10 maintains the volume of zone 20 substantially filled with vapor, excess vapor being condensed by the outer cooling jacket 18 and collected in a reservoir 28 around the inside periphery or wall of the unit adjacent to the outer cooling jacket 18.

Following such treatment of the part in the liquid dye penetrant, the part 22 is raised into the vapor zone 20 to its full line position shown in FIG. 2, and maintained therein for a period of, e.g., about 30 seconds to about 1 minute. Solvent vapors 21, e.g., 1,1,1-trichloroethane, in zone 20 are condensed on the part in the vapor zone, and the condensed solvent serves to wash excess dye penetrant on the surface of the part, including pyrrolidone and dye, back into the chamber containing the liquid dye penetrant composition 10, dye penetrant including pyrrolidone and dye remaining in the cracks and voids in the part surface. If desired, such washing of excess penetrant from the part surface can be aided by additional spraying with pure trichloroethane which was condensed from vapor zone 20 and trapped in the reservoir 28. This is accomplished by pumping the pure trichloroethane or equivalent volatile solvent from the reservoir via pump 30 and hose 32 through the nozzle 34, the sprayed stream of such solvent, indicated at 36, being directed into vapor zone 20, as seen in FIG. 1, to impinge on the part 22 therein (FIG. 2.).

The part is then raised to the position indicated in dotted lines at 22b in FIG. 2, over the vapors 21 and vapor zone 20, and is maintained in such position to permit drying of the excess solvent on the part, such drying occurring in a very short time and being almost instantaneous.

The part is then removed and can be inspected under suitable lighting conditions, e.g., fluorescent light, with or without prior application of a developer to the part surface, for indication of cracks or flaws from the dye penetrant therein.

The above procedure can be modifiied by immediately withdrawing the dye penetrant-treated part 22 from immersion in the dye penetrant composition 10, its position indicated at 22a, through the vapor zone 20 to its position indicated at 22b above the vapor zone 20, without removing excess penetrant in zone 20. After the part has cooled sufficiently at position 22b, it is lowered into vapor zone 20 for stripping of excess penetrant from the part surface as described above, and then again raised to position 22b for drying as previously noted.

According to still another modification, excess penetrant can be removed from the part using essentially only the spray 36 of pure condensed volatile solvent, against the part.

All of the methods described above provide high sensitivity levels of penetrant inspection.

Thus there is provided a closed system in which the degreaser type solvent, preferably 1,1,1-trichloroethane, is continuously evaporated and condensed back into the liquid contents, and also trapped in the reservoir 28, and the basic penetrant composition is similarly continuously washed back from the part into the liquid contents 10 of the chamber by the hot fumes of the degreaser-type solvent. The only loss in this system is the minute portion of dye penetrant which remains entrapped within the defects and voids of the part. Therefore, the liquid penetrant composition containing a degreaser-type solvent such as trichloroethane is maintained without requiring continuous addition of components, until such time as it becomes so contaminated with grease, dirt or oils from the parts undergoing treatment, that it is discarded and replenished.

Although in general, the dye penetrant contained in the cracks of the part exudes vary readily and forms brilliant indications, the use of a developer can enhance the degree of sensitivity of the process.

Where a developer composition is employed, any one of the three general types of developer compositions, namely, dry powder, wet aqueous (water-base) and wet nonaqueous (volatile solvent base) developer compositions can be employed. In each case, the developer composition contains a light colored powder, forming a coating which contrasts with the color of the dye in the penetrant and which acts as a wick or blotter, and causes liquid penetrant containing the dye, e.g., fluorescent dye, which was retained in the cracks or surface flaws, to be drawn up out of the surface defects by capillary action and to "bleed" through the powder. Preferred developer compositionns for use in conjunction with the dye penetrant composition and process, according to the invention, are those described in my copending application Ser. No. 212,799, filed Dec. 27, 1971, which is a dry powder developer containing fumed alumina, fumed silica, fumed titanium dioxide and talc, and in my copending application Ser. No. 295,061, filed Oct. 4, 1972, and which is a wet nonaqueous developer composition consisting essentially of isopropyl alcohol, talc and glycol monobutyl ether.

The descriptions of such developer compositions contained in the above copending applications are incorporated herein by reference.

Various metal parts can be treated according to the invention process for dye penetrant inspection. These include for example aluminum, titanium, brass and steel parts. The invention process is particularly effective and applicable for certain steels which otherwise tend to corrode in water washable penetrant systems. These steels are notably the non-stainless types such as 4130 (low carbon), and all mild steels.

The following examples serve to illustrate but are not limitative of the benefits and advantages obtained by practice of the present invention.

EXAMPLE 1

A dye penetrant composition was prepared by adding to 15 gallons of 1,1,1-trichloroethane, 1 gallon of the followng liquid dye penetrant:

| N-methyl-2-pyrrolidone N-methyl-2-pyrrolidone | Parts by Volume |
|---|---|
| | 2½ |
| Isobutyl heptyl ketone | 7½ |
| Tergitol Nonionic NPX | .5 |
| Tergitol Nonionic NP-14 | 7½ |
| Calcoflour White RW | 2 |
| Fluorol 7 GA | 0.66 |

The resulting liquid dye penetrant composition was placed in the liquid chamber of a vapor degreaser apparatus of the type described above, and illustrated in the drawing, and heated to 166° F and maintained at such temperature. At this temperature the dye penetrant solution was visibly boiling and generating fumes or vapors of the trichloroethane into the vapor zone of the degreaser, above the liquid dye penetrant-containing chamber.

A chromium-plated brass panel containing cracks 0.00002 to 0.0001 inch in width, closely distributed over its entire surface was lowered through the vapor zone and dipped immediately into the hot bubbling trichloroethane-containing penetrant solution for a short period of time of the order of about 1 minute, to permit the hot solution to penetrate into the cracks of the part surface.

The part was then raised out of the solution and into the vapor zone above the solution. The part was maintained in such vapor zone for about 30 seconds, the trichloroethane vapors in the vapor zone condensing on the surface of the part, and washing and removing surface excess liquid penetrant from the part, back into the boiling liquid contents of the chamber. The part was then raised above the vapor zone and was dried almost instantly.

The panel or part was then placed under black light (fluorescent) illumination, showing bright fluorescent indications from numerous readily defined microcracks in the surface of the panel, disclosing the location and size of such microcracks.

The dye penetrant solution in the chamber accumulated approximately 6 weeks of continuous boiling without noticeable change in performance, during which time numerous parts were processed in the manner noted above. Finally the solution lost its fluorescence.

EXAMPLE 2

The process of Example 1 was repeated with the exception that while the panel was maintained in the vapor zone during removal of excess penetrant from the surface of the panel, the panel was also sprayed with liquid trichloroethane to assist the removal of the excess penetrant from the panel.

EXAMPLE 3

The procedure of Example 1 was repeated, except that after removal of the panel from the vapor zone, followed by drying, the surface of the panel was covered with a dry developer having the following composition, according to my above copending application Ser. No. 212,799:

| Components | Percent by weight |
|---|---|
| Talc | 52 |
| Alumina | 35 |
| Silica | 4 |
| TiO$_2$ | 9 |

The above developer was permitted to dwell on the surface of the test panel for a period of 2 minutes.

Excess developer composition was then carefully removed from the surface of the panel by means of a gentle air blast.

The panel was then placed under fluorescent illumination to disclose a high concentration of fluorescent indications from numerous microcracks, closely corresponding to the brightness and concentration of the fluorescent indications from the microcracks in the panel according to the procedure of Example 1.

EXAMPLE 4

To 15 gallons of 1,1,1-trichloroethane was added 4 gallons of the following dye penetrant.

| | Parts by Volume |
|---|---|
| N-methyl-2-pyrrolidone | 2½ |
| Isobutyl heptyl ketone | 20 |
| Tergitol Nonionic NPX | 15 |
| Calcofluor White RW | 2 |
| Fluorol 7 GA | 0.66 |

The resulting dye penetrant composition was placed in the chamber of a vapor degreaser as described above and maintained at a temperature of about 166° F, generating vapors of the trichloroethane into the vapor zone above the liquid penetrant composition.

An aluminum panel containing microcracks of substantially the same size as the microcracks in the chromium plated brass test panel of Example 1, closely distributed over its entire surface, and having an oily surface was first lowered into the vapor zone and maintained therein for a period of about 2 minutes to clean the part surface of the oily substance.

The panel was then lowered into the bubbling liquid contents of trichloroethane and penetrant solution and maintained therein for about 1 minute.

The panel was then raised into the vapor zone and subjected to contact with the trichloroethane vapors for a period of about 30 seconds, the vapors condensing on the panel surface and washing liquid penetrant from the panel surface into the boiling dye penetrant composition.

The panel was then raised above the vapor zone, dried and placed under fluorescent illumination, disclosing bright fluorescent indications of high resolution and definition from numerous readily defined microcracks therein.

EXAMPLE 5

To 15 gallons of 1,1,1-trichloroethane was added 7 gallons of a liquid dye penetrant of the following composition:

| | Parts by Volume |
|---|---|
| N-methyl-2-pyrrolidone | 7 |
| Isobutyl heptyl ketone | 45 |
| Tergitol Nonionic NP-14 | 30 |
| Calcofluor White RW | 6 |
| Fluorol 7 GA | 3 |

The resulting dye penetrant composition was placed in the chamber of a degreaser of the type described above and heated to temperature of approximately 166° F to effect boiling of the trichloroethane and formation of a trichloroethane vapor zone above the liquid contents.

A titanium part having a greasy dirty surface and containing microcracks within the range of those noted for the test panel in Example 1, was lowered into the vapor zone and maintained therein for about 2 minutes, the trichloroethane vapors condensing on the part surface removing the grease and dirt from the part surface.

The part was then immersed in the heated bubbling liquid trichloroethane solution of dye penetrant, and maintained therein for a period of about 1 minute.

The part was then withdrawn to a position above the vapor zone without removing any excess penetrant from the part surface, and after the part cooled, the part was lowered into the vapor zone and maintained therein for a period of about 45 seconds until excess penetrant was removed and washed back into the heated penetrant composition, by the vapors of trichloroethane condensing on the part surface.

Following removal of excess dye penetrant from the surface of the titanium part, the part was raised above the vapor zone and dried, and was then subjected to fluorescent illumination, disclosing bright fluorescent indications from a high concentration of numerous microcracks in the part.

EXAMPLE 6

The procedure of Example 5 was repeated except that following removal of excess liquid dye penetrant from the surface of the part, and drying thereof, the part surface was then covered with a nonaqueous developer having the following composition, according to my above copending application Ser. No. 295,061:

| Components | Percent by weight |
|---|---|
| Isopropyl alcohol | 70.5 |
| Talc | 28.6 |
| Glycol monobutyl ether | 0.9 |

The above developer was permitted to remain on the surface of the part for a period of about 2 minutes, until substantially all of the isopropyl alcohol had evaporated and a substantially dry powder coating was formed.

The panel was then placed under fluorescent illumination, disclosing bright fluorescent indications of high resolution from the numerous readily defined microcracks therein, substantially similar to the results obtained in Example 5.

EXAMPLE 7

The procedure of Example 1 was repeated except that to the 15 gallons of trichloroethane was added dye penetrant comprising 10 parts of N-methyl-2-pyrrolidone and one part of daylight visible Oil Red "O" dye.

The part employed was an aluminum panel containing gross cracks and after removal of excess dye penetrant from the surface of the part by contact with and condensation of the trichloroethane vapors, removal of the part from the vapors and drying of the surface thereof above the vapor zone, the part was then exposed to ordinary daylight, disclosing dye trace patterns from the cracks in the part surface.

EXAMPLE 8

The procedure of Example 1 was repeated employing trichloroethylene in place of 1,1,1-trichloroethane, with the liquid dye penetrant solution containing the trichloroethylene in the chamber being heated to about 190° F causing boiling and generation of trichloroethylene vapors into the vapor zone.

Results obtained were similar to those of Example 1.

EXAMPLE 9

The procedure of Example 4 was substantially repeated employing trichloroethylene in place of the 1,1,1-trichloroethane of the dye penetrant composition of Example 4.

The resulting dye penetrant composition contained in the chamber of the degreaser was maintained at about 190° F during operation.

Results similar to those of Example 4 were obtained.

EXAMPLE 10

The procedure of Example 1 was repeated employing Freon TF in place of 1,1,1-trichloroethane, with the liquid dye penetrant solution containing the Freon TF in the chamber being beated to about 117° F causing boiling and generation of Freon TF vapors into the vapor zone.

Results obtained were similar to those of Example 1.

EXAMPLE 11

The procedure of Example 5 was repeated except employing the following dye penetrant to which the tricloroethane was added:

| Components | Parts by Volume |
| --- | --- |
| N-methyl-2-pyrrolidone | 15 |
| Blancophor FFG (water soluble dye) | 2 |

Further, after cooling the part while it was maintained in a position above the vapor zone, the part was sprayed with pure liquid trichloroethane from the condensing reservoir of the unit, the dye penetrant thus washed from the part surface falling back into the boiling dye penetrant composition in the liquid dye penetrant chamber.

Results similar to Example 5 were obtained.

From the foregoing it is seen that the invention provides a unique process and dye penetrant composition which permits facile removal of excess dye penetrant solution from a part to be inspected by dye penetrant inspection methods, after the part has been treated with dye penetrant solution. Such method and dye penetrant composition, containing pyrrolidone dye solvent and a volatile degreaser-type volatile solvent such as 1,1,1-trichloroethane, affords high temperature heating of the dye penetrant composition in the absence of any deleterious affects, to permit generation of volatile solvent vapors so that the part, following contact with the dye penetrant composition, then readily can be subjected to contact with the vapors or condensed vapors of such volatile solvent, for removal of excess dye penetrant from the part surface, and return of such excess dye penetrant to the heated dye penetrant composition. Thus there is provided a procedure and means which, by use of a degreaser apparatus or unit, can be employed effectively in a series of rapidly executed operations taking place in a relatively confined space, to clean a part, that is remove surface oil and dirt, apply a heated dye penetrant solution, remove excess penetrant solution to develop the penetrant entrapments, dry the part, and to form visible indications of such entrapments after the parts are removed from the unit.

Since various changes and modifications of the invention will occur to and can be made readily by those skilled in the art without departing from the inventive concept, the invention is not to be taken as limited except by the scope of the appended claims.

I claim:

1. A method for detecting cracks and flaws in the surface of an object, which comprises contacting said object with a heated liquid dye penetrant composition which consists essentially of an N-alkyl-2-pyrrolidone, said alkyl group containing from one to four carbon atoms, a dye which is soluble in said pyrrolidone, and a volatile solvent which produces vapors of said volatile solvent in a zone above said heated dye penetrant composition, removing said object from said heated liquid dye penetrant composition, said object containing excess liquid dye penetrant on the surface of said object, introducing said object into said zone of vapors of said volatile solvent, contacting condensed or condensing volatile solvent vapors with said object and washing said excess liquid dye penetrant from said surface of said object back into said heated liquid dye penetrant composition, together with said condensed vapors of said volatile solvent, a portion of said last mentioned liquid dye penetrant remaining in said cracks and flaws in said surface, and viewing the surface of said object under lighting conditions to obtain colored traces from the dye in said cracks and flaws.

2. A method as defined in claim 1, wherein said volatile solvent is a halogenated organic solvent which has a boiling point not in excess of about 200° F.

3. A method as defined in claim 1, wherein said volatile solvent is selected from the group consisting of 1,1,1-trichloroethane and trichloroethylene.

4. A method as defined in claim 1, wherein said object initially contains grease or oil on the surface thereof, including first introducing said object into said zone of vapors of said volatile solvent, and maintaining said object in said zone for a period sufficient to remove said grease or oil, prior to contacting said object with said heated liquid dye penetrant composition.

5. The method as defined in claim 1, said contacting said object with condensed or condensing volatile solvent vapors including spraying said object with said volatile solvent in liquid form, in said zone of vapors, to aid in washing said excess dye penetrant from said surface of said object.

6. The method as defined in claim 3, said contacting said object with condensed or condensing volatile solvent vapors including spraying said object with said volatile solvent in liquid form, in said zone of vapors, to aid in washing said excess dye penetrant from said surface of said object.

7. The method as defined in claim 1, said contacting said object with condensed or condensing volatile solvent vapors including spraying said object with said volatile solvent in liquid form, in said zone of vapors, to aid in washing said excess dye penetrant from said surface of said object, said spraying said object with said liquid volatile solvent occurring simultaneously with condensation of said volatile solvent vapors in said vapor zone, on said object.

8. The method as defined in claim 1, including withdrawing said object to a position above said vapor zone following treatment of said object in said zone of vapors, to permit drying of any excess liquid volatile solvent on the surface of said object.

9. The method as defined in claim 3, including withdrawing said object to a position above said vapor zone following treatment of said object in said zone of vapors, to permit drying of any excess liquid volatile solvent on the surface of said object.

10. The method as defined in claim 4, including withdrawing said object to a position above said vapor zone following treatment of said object in said zone of vapors, to permit drying of any excess liquid volatile solvent on the surface of said object.

11. The method as defined in claim 1, including withdrawing said object to a position above said vapor zone following contact of said object with said dye penetrant composition, to permit cooling of said object, and thereafter introducing said object into said zone of volatile vapors to wash said excess liquid dye penetrant from said surface.

12. A method as defined in claim 1, carried out in a degreaser unit, said heated liquid dye penetrant composition contained in a lower chamber in said unit and said zone of vapors being located in an upper chamber of said unit above said dye penetrant composition, said lower chamber being heated to provide said heated liquid dye penetrant composition therein, said zone of vapors being cooled by a cooling jacket around said upper chamber to aid in condensing said volatile solvent vapors in said zone, a portion of said condensed volatile solvent vapors forming pure liquid volatile solvent being trapped and collected in a reservoir in said upper chamber adjacent said zone of vapors, for spraying said pure liquid volatile solvent on a part introduced into said zone of vapors.

13. A method as defined in claim 10, carried out in a degreaser unit, said heated liquid dye penetrant composition contained in a lower chamber in said unit and said zone of vapors being located in an upper chamber of said unit above said dye penetrant composition, said lower chamber being heated to provide said heated liquid dye penetrant composition therein, said zone of vapors being cooled by a cooling jacket around said upper chamber to aid in condensing said volatile solvent vapors in said zone, a portion of said condensed volatile solvent vapors forming pure liquid volatile solvent being trapped and collected in a reservoir in said upper chamber adjacent said zone of vapors, for spraying said pure liquid volatile solvent on a part introduced into saie zone of vapors.

14. The method as defined in claim 1, including applying a developer to said surface after removing said excess dye penetrant from said surface, and prior to said viewing the surface of said object.

15. The method as defined in claim 13, including applying a developer to said surface after removing said excess dye penetrant from said surface and prior to said viewing the surface of said object.

16. The method as defined in claim 1, said pyrrolidone being N-methyl-2-pyrrolidone, said dye being a fluorescent dye and said volatile solvent being 1,1,1-trichloroethane.

17. A method as defined in claim 10, said pyrrolidone being N-methyl-2-pyrrolidone, said dye being a fluorescent dye and said volatile solvent being 1,1,1-trichloroethane.

18. A method as defined in claim 9, said pyrrolidone being N-methyl-2-pyrrolidone, said dye being a fluorescent dye and said volatile solvent being 1,1,1-trichloroethane, said pyrrolidone being present in an amount ranging from about 0.2% to about 45%, and said trichloroethane volatile solvent being present in said dye penetrant composition in an amount ranging from about 50% to about 97%, by volume of said dye penetrant composition, the ratio of said dye to said pyrrolidone in said composition ranging from about one part of dye to about 25 parts of pyrrolidone, to about two parts of said dye to about one part of pyrrolidone, by volume.

19. A method as defined in claim 1, said volatile solvent selected from the group consisting of 1,1,1-trichloroethane, trichloroethylene, 1,1,2-trichloro-1,2,2-trifluoroethane, trichlorofluoromethane and bromotrifluoromethane.

* * * * *